US005257872A

United States Patent [19]

Morgen et al.

[11] Patent Number: 5,257,872

[45] Date of Patent: Nov. 2, 1993

[54] HIGH POWER WAVEGUIDE SWITCH AND METHOD

[75] Inventors: Robert Morgen, Los Angeles; David S. Levinson, Woodland Hills, both of Calif.

[73] Assignee: Hughes Aircraft Company, Los Angeles, Calif.

[21] Appl. No.: 878,592

[22] Filed: May 5, 1992

[51] Int. Cl.[5] .......................... H01P 3/00; F16B 21/00

[52] U.S. Cl. .......................................... 403/30; 403/28; 403/404; 333/106

[58] Field of Search .................................... 403/28-30, 403/273, 404; 333/106, 108

[56] References Cited

U.S. PATENT DOCUMENTS

| | | | |
|---|---|---|---|
| 2,867,460 | 1/1959 | Johnson | 403/28 |
| 2,999,213 | 9/1961 | Olivieri | 333/106 |
| 3,454,313 | 7/1969 | Lohneis | 403/30 |
| 4,024,481 | 5/1977 | Kivi . | |
| 4,521,754 | 6/1985 | Ranghelli . | |
| 4,757,292 | 7/1988 | Basil . | |
| 4,771,644 | 9/1988 | Meron | 403/30 |
| 4,920,324 | 4/1990 | Whittaker | 333/106 |

*Primary Examiner*—Randolph A. Reese
*Assistant Examiner*—Anthony Knight
*Attorney, Agent, or Firm*—Gordon R. Lindeen, III; Wanda K. Denson-Low

[57] ABSTRACT

A mechanism (100) for fixing the relative position of two members including a first member (104) having a first coefficient of thermal expansion and a second member (102) positioned adjacent to the first member and having a second coefficient of thermal expansion. The first member (104) is adapted to receive thermal energy. The first and second members are mounted for relative motion therebetween at a first temperature and are in contact at a relative fixed position at a second temperature. In a specific embodiment, a microwave control valve (100) for use in a waveguide is disclosed and includes a housing (104) having a first coefficient of thermal expansion and a first plurality of housing waveguide openings (130). A rotor (102) is positioned within the housing and has a second coefficient of thermal expansion and a plurality of rotor waveguide openings (132). The housing (104) is adapted to receive RF energy. An actuator (106) is provided to rotate the rotor for aligning at least two of the rotor waveguide openings (132) with at least two of the housing waveguide openings (130) for directing the RF energy through the valve. The housing and the rotor are mounted for relative motion therebetween at a first temperature and are in contact at a relative fixed position at a second temperature. Thus, the invention provides a control valve (100) for use in high power microwave systems, which eliminates a rotor-housing clearance gap (105) after RF energy is applied for increasing the average power handling capability.

17 Claims, 2 Drawing Sheets

HIGH POWER WAVEGUIDE SWITCH AND METHOD

BACKGROUND OF THE INVENTION

1. Field of the Invention

The present invention relates to microwave systems. More specifically, the present invention relates to methods and apparatus for waveguide switches utilized in high power microwave systems.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

2. Description of the Related Art

In spacecraft and other applications, the reliability of certain systems is critical. Accordingly, many systems are designed with redundant components to ensure continued operation of the system. Waveguide switches are often used in communication systems to switch in a redundant component, circuit or system. Hence, the reliability of the switch is important as is the weight for spacecraft applications.

The reliability of waveguide switches for use with high power when constructed in accordance with conventional teachings is limited. One reason for the limited reliability is that prior waveguide switches have a small clearance gap between the rotor and the housing which measures under 0.002 inches (i.e., less than 2 mils). The clearance gap allows the rotor to turn within the housing on bearings without binding or frictional drag. Also, the gap produces a low impedance transmission line that is part of the low loss RF choke of the waveguide switch. The small gap, however, is prone to voltage breakdown and thus limits the power handling capability. Larger gaps result in degraded electrical performance of the switch rendering it unacceptable.

Another problem associated with waveguide switches of conventional design is heat generation. Some of the RF power passing through the switch is absorbed which generates heat in the rotor since the rotor is essentially an extension of the waveguide. Generally, in space applications, the rotor is cooled primarily by the radiation of the heat to the switch body. The rotor can be comprised of, for example, aluminum, magnesium or zinc. When the rotor is heated, it expands resulting in a net reduction of the size of the clearance gap. To ensure that the switch will operate when the switch is hot, the clearance gap must initially be made larger when at ambient temperature. Then the gap will be at the proper clearance when the switch is normally operating after RF power is applied.

A third problem associated with known waveguide switches operating in a vacuum is that at high power levels and in the presence of the correct combination of voltage, frequency and gap size, the multipaction phenomena can occur within the clearance gap. Similarly, during the propagation of electromagnetic waves in air, ionization of the gases in the air can occur in the presence of a high voltage (e.g., 72KV/inch) within the waveguide. The ionization of the gases can result in electrical break down, arcing and short circuiting between the waveguide walls. This phenomena can occur in waveguide switches for communication satellites which also operate in a vacuum.

Whereas at ambient pressure, the electric field across the small clearance gap can cause ionization breakdown estimated at approximately three kilowatts peak. As presently configured, the waveguide switch of the prior art is estimated to handle less than five-hundred watts average and peak power in vacuum. By comparison, WR75 waveguide can accommodate seven kilowatts peak in vacuum and in excess of four-hundred kilowatts peak power in air before breakdown occurs. Therefore, the presence of the clearance gap clearly limits the power handling capability of prior art waveguide switches. Furthermore, machining tolerances cause the clearance gap size in identical switches to vary. This, in turn, results in the insertion loss and the isolation of RF paths in identical switches to vary resulting in inconsistent switch parameters. It is noted that low loss and high isolation of RF paths are imperative characteristics for the successful operation of high power waveguide switches.

A fourth problem associated with known waveguide switches is the switch power rating. The waveguide switches of the past are limited in power switching capability which is approximately one kilowatt peak. If the waveguide switch is to be utilized for other than redundancy switching, the switch rating could be inadequate. For example, switching individual solid state power amplifiers in a channel requires a power switch rating of approximately 50 watts. Thus, conventional switches typically having a power switch rating of approximately 240 watts are adequate. However, use of prior art switches, for example, downstream of the output multiplexers of a communication repeater to switch many sets of channels associated with the output multiplexers, would certainly exceed the power switching capability of known waveguide switches.

Thus, there is a need in the art for an improvement in conventional waveguide switches for high power microwave systems.

SUMMARY OF THE INVENTION

The need in the art is addressed by the high power waveguide switch of the present invention. The invention is a mechanism for fixing the relative position of two members including a first member having a first coefficient of thermal expansion and a second member positioned adjacent to the first member and having a second coefficient of thermal expansion. The first member is adapted to receive thermal energy. The first and second members are mounted for relative motion therebetween at a first temperature and are in contact at a relative fixed position at a second temperature.

In a specific embodiment, a microwave control valve for use in a waveguide is disclosed and includes a housing having a first coefficient of thermal expansion and a first plurality of housing waveguide openings. A rotor is positioned within the housing and has a second coefficient of thermal expansion and a plurality of rotor waveguide openings. The housing is adapted to receive RF energy. An actuator is provided to rotate the rotor for aligning at least two of the rotor waveguide openings with at least two of the housing waveguide openings for directing the RF energy through the valve. The housing and the rotor are mounted for relative motion therebetween at a first temperature and are in contact at a relative fixed position at a second temperature. Thus, the invention provides a control valve for use in high power microwave systems which eliminates the rotor-housing clearance gap, after RF energy is applied, for increasing the average power handling capability.

DESCRIPTION OF THE INVENTION

Figure 1:
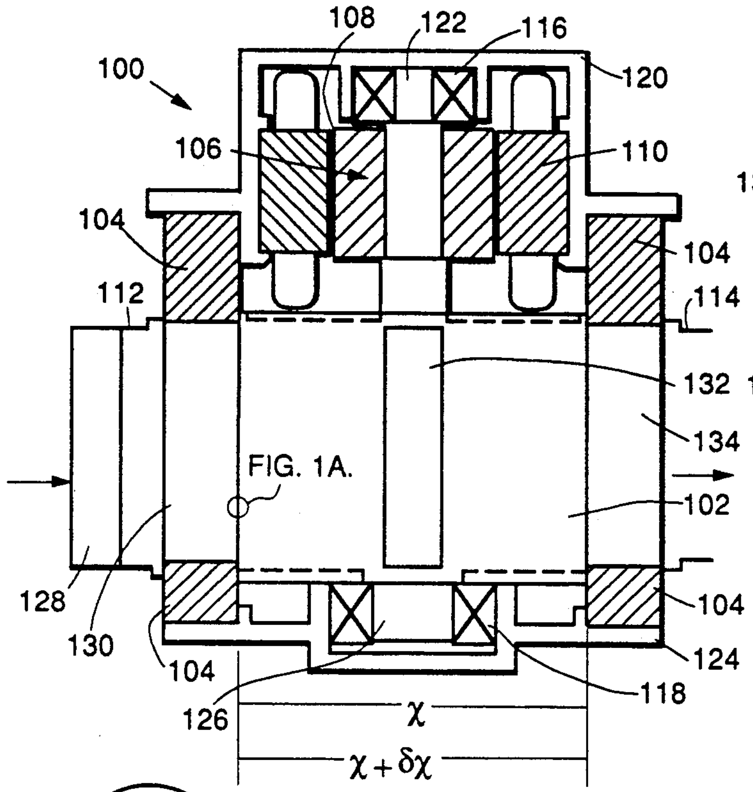
FIG. 1 is a cross-sectional view of an illustrative embodiment of a high power waveguide switch in accordance with the present invention showing the dimensions of the rotor before RF power is applied to the switch.

The active elements of a communication repeater system in a spacecraft must have redundancy to ensure reliability. Therefore, waveguide switches known in the past having a rotor separated from the switch housing by a small clearance gap are commonly utilized. Unfortunately, the small clearance gap (approximately 1.5 mils or 0.0015") in prior art waveguide switches is prone to voltage breakdown and thus limits the power handling capability of the switch. Further, to ensure that the waveguide switch of the prior art will operate when the switch is hot, the clearance gap must initially be made larger when at ambient temperature. Additionally, known waveguide switches operating in a vacuum at high power levels and in the presence of the correct combination of voltage, frequency and gap size are subject to the multi-paction phenomena within the clearance gap.

As shown in drawings FIGS. 1-4 for purposes of illustration, the invention is embodied in a high power waveguide switch 100 of the type having a rotor 102 mounted within a switch housing 104 which rotatably controls the path by which RF energy passes through the switch 100 before RF power is applied and which eliminates a small clearance gap 105 between the housing 104 and the rotor 102 after RF power is applied to eliminate the multipaction phenomena.

In accordance with the present invention, the rotor 102 and the housing 104 cooperate to provide the small clearance gap 105 therebetween for repositioning the rotor 102 within the housing 104 before RF power is applied and to eliminate the clearance gap 105 between the rotor 102 and the housing 104 after RF power is applied to the switch 100. The elimination of the gap 105 between the rotor 102 and the housing 104 precludes the multipaction phenomena from occurring within the gap, raises the peak power level at which multipaction occurs to the power level of the waveguide, increases the average power handling capability, reduces the insertion loss, improves isolation between RF paths, and reduces the temperature differential between the rotor 102 and the housing 104 within the switch 100.

Figure 2:
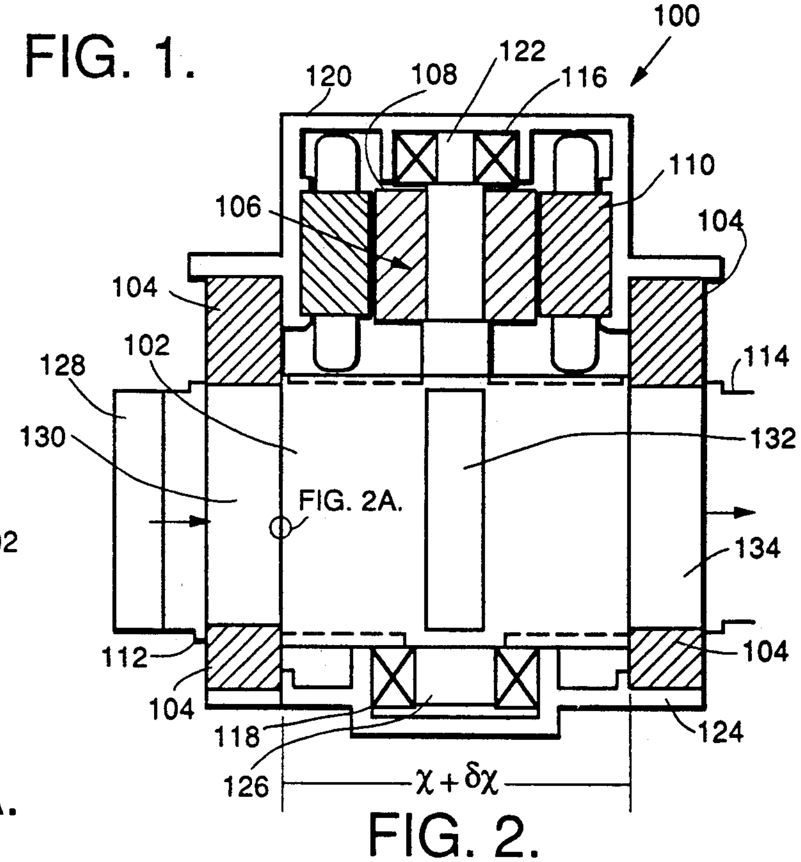
FIG. 2 is a cross-sectional view of the illustrative embodiment of the high power waveguide switch of FIG. 1 showing, the expanded dimensions of the rotor after RF power is applied to the switch.
Figure 2A:
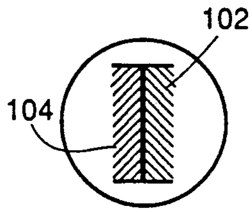

The present invention discloses the waveguide switch 100 which is suitable for spacecraft applications and which is capable of conducting very high peak and average power up to the power levels normally associated with the size of waveguide from which the switch is constructed. These advantages are achieved by repositioning the rotor 102 to a desired position within the housing 104 before RF power is applied and then permitting the rotor to contact the housing after RF power is applied as shown in FIGS. 1 and 2. This operational condition occurs at a low power level by constructing the rotor 102 from a material that expands at a rate greater than the rate of expansion of the material comprising the housing 104 due to the dissipated heat in the switch 100. The result is that the clearance gap 105, necessary to reposition the rotor 102, closes and the switch 100 operates as if it were a section of waveguide while the RF power is applied. Repositioning the rotor within the housing permits redirecting the RF energy through the various waveguides of the switch while the housing interfaces with at least one input transmission line 112 and output waveguide 114. The housing further provides mechanical structure to the switch 100.

Thus, an objective of the present invention is the purposeful elimination of the clearance gap 105 between the rotor 102 and the housing 104 when high RF power is conducted through the switch 100. This is achieved by constructing the rotor 102 and the housing 104 of metals having different coefficients of thermal expansion. An example of suitable materials include a rotor constructed of either magnesium or zinc and a housing constructed of either invar or titanium. The magnesium and zinc each have a higher coefficient of thermal expansion than either the invar or titanium.

In the preferred embodiment, a rotor 102 constructed of magnesium has a coefficient of thermal expansion of 26 micro-inches/inch/degree Centigrade while a rotor constructed of zinc has a coefficient of thermal expansion of 39.7 micro-inches/inch/degree Centigrade. Likewise, a housing 104 constructed of invar has a coefficient of thermal expansion of (0-2) micro-inches/inch-/degree Centigrade while a housing comprised of titanium has a coefficient of thermal expansion of 9 microinches/inch/degree Centigrade. It is apparent that a rotor comprised of either magnesium or zinc has a coefficient of thermal expansion that is much higher than the coefficient of thermal expansion for a housing comprised of either invar or titanium.

When power is not being conducted through the switch 100, the clearance gap 105 exists between the rotor 102 and the housing 104 which permits the rotor to be located to a desired position within the housing 104 by an actuator 106 as shown in FIGS. 1 and 2. The actuator 106 can be any suitable means for repositioning the rotor 102 such as a threaded shaft that is manually operated to the desired position. In the preferred embodiment, the actuator 106 can be an electromagnetic device such as a stepper motor or other servo-controlled device that is remotely controlled to reposition the rotor 102. The actuator 106 includes a magnet 108 which can be a permanent magnet or an electromagnet utilized in conjunction with a stator winding 110 for providing starting torque to reposition the rotor 102. Although reference is made to a rotor 102 that is repositioned within the housing 104 by rotation, it is specifically noted that the rotor-housing combination also includes a rotor having a flat plate construction that is repositioned by the actuator 106 within the housing 104 in a translational manner.

As the power transmitted through the switch increases, the temperature of the rotor 102 increases due to ohmic losses. The temperature rise within the rotor 102 exceeds the corresponding temperature rise in the housing 104 because the RF path through the rotor is longer. Furthermore, the only conduction path between the rotor 102 and housing 104 is through a set of bearings 116 and 118 which are poor heat conductors and which are installed with a light preload. The top bearing 116 is positioned above the actuator magnet 108 within a stator housing 120 and surrounds a top shaft 122 utilized for repositioning the rotor 102. Likewise, bottom bearing 118 is positioned beneath the rotor 102 within a bottom plate 124 and surrounds a bottom shaft 126. Both the top and bottom bearings 116 and 118 support the rotor 102 via the top and bottom shafts 122 and 126, respectively, to permit repositioning the rotor 102. The stator housing 120 provides mechanical integrity to the top bearing 116 and houses the laminated coil stator winding 110 while the bottom plate 124 supports bottom bearing 118 on which the rotor 102 is repositioned.

The RF power transmitted through the switch 100 originates with an RF source 128 and passes through the input transmission line 112 into a housing waveguide opening 130 of housing 104 as shown by the arrows in FIGS. 1 and 2. The housing waveguide opening 130 interfaces with one of a plurality of rotor waveguides 132. The opening within rotor waveguide 132 shown in FIGS. 1 and 2 is positioned to align with the housing waveguide opening 130 to pass the RF energy into the rotor waveguide 132. Upon exiting the rotor waveguide 132, the RF energy is directed through a second housing waveguide opening 134 which interfaces with an opposite opening of the rotor waveguide 132. Thereafter, the RF energy exits the waveguide switch 100 as is shown by the arrows in FIGS. 1 and 2.

After the RF power is applied, the heat generated within the switch 100 is utilized to accomplish the objective of eliminating the clearance gap 105 in the following way. The rise in the temperature of the rotor 102 causes the metal comprising the rotor to expand at a rate greater than the expansion rate of the material comprising the housing 104. The differential expansion rate is caused by the different coefficients of thermal expansion of the rotor 102 and housing 104 and by mounting the housing to a heat sink such as the chassis (not shown).

At a calculable and predetermined power level, well below the point that breakdown would occur in the clearance gap 105, the rotor 102 physically contacts the housing 104 eliminating the clearance gap 105. Note that the enlarged diagram shown adjacent to FIG. 1 illustrates the 1.5 mil clearance gap 105 by the dimension "$\delta x$" and that the difference in the dimensions appearing at the bottom of FIG. 1 is $[(x+\delta x)-(x)]$ which equals the gap dimension "$\delta x$". Further, note that the enlarged diagram shown adjacent to FIG. 2 indicates that the rotor 102 and the housing 104 are in contact so that the outside dimension of the rotor equals the inside dimension of the housing (e.g., "$x+\delta x$") indicating that the gap 105 has been eliminated.

After contact is established, the rotor 102 and the housing 104 assume practically the same temperature. Since the housing is connected to a heat sink, heat dissipation and temperature equilibrium occur by conduction instead of by radiation as in the past. Therefore, the heat dissipation problem that existed with waveguide switches of the prior art has been solved. Since the rotor 102 and the housing 104 are in contact, the gap dimension "$\delta x$" shown in FIGS. 1 and 2 is equal to zero. Thus, the voltage can be increased within the waveguide switch 100 without introducing the multipaction phenomena. Therefore, the multipaction phenomena within the clearance gap 105 has been eliminated. As long as power is applied, the rotor 102 and housing 104 will operate as a single piece of waveguide with the clearance gap 105 effectively eliminated.

When the power level decreases, the temperature of the rotor 102 will also decrease and the diameter of the rotor 102 will decrease by the dimension "$\delta x$". The rotor 102 will lose contact with the inner wall of the housing 104 and the rotor 102 can once again be repositioned within the housing 104. To ensure that the rotor 102 and the housing 104 do not become cold-welded, the touching surfaces are coated with unlike materials to prevent permanent adhesion. For example, the touching surface of the rotor 102 can be coated with chromium while the touching surface of the housing 104 can be coated with unplated aluminum. It is emphasized that repositioning of the rotor 102 must be attempted only after the RF source 128 is deenergized and the switch 100 has sufficiently cooled. Otherwise, repositioning of the rotor 102 may be impaired and the RF energy would be reflected back into the circuitry resulting in severe damage. Therefore, the actuator 106 is electrically interlocked to prevent repositioning of the rotor 102 while the RF source 128 is energized.

Figure 3:
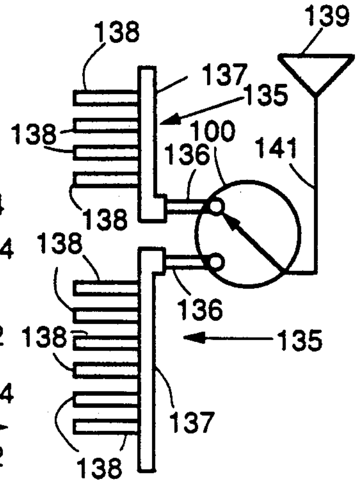
FIG. 3 is a schematic diagram representative of the high power waveguide switch of FIGS. 1 and 2 employed for connecting one of a pair of subsections of output combining multiplexers to an output antenna.
Figure 1A:
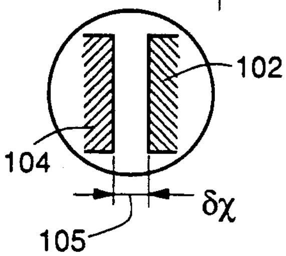

The novel design of the waveguide switch 100 increases the average power handling capability of the switch to that of the waveguide 132. This feature ensures that the peak power present at a common output waveguide can be adequately handled by the switch 100. This advantageous feature is illustrated in FIG. 3 in which two separate groups of output combining multiplexers 135 feed two separate common combining waveguides 136. Each output combining multiplexer 135 includes an output manifold 137 and a plurality of channel filters 138. The waveguide switch 100 is shown switching between the separate combining waveguides 136 so that only one of the output multiplexers 135 is connected to an output antenna 139 via a waveguide 141. Thus, the high power waveguide switch 100 can be used to direct the RF energy from either of two combining waveguides 136 to the single transmitting antenna 139 for retransmission. Such a repeater design can be used as an in-orbit (or ground) spare that is easily reconfigurable upon command. This capability could spare collocated communication repeaters, each of which would be provided with a different output combining waveguide.

Figure 4:
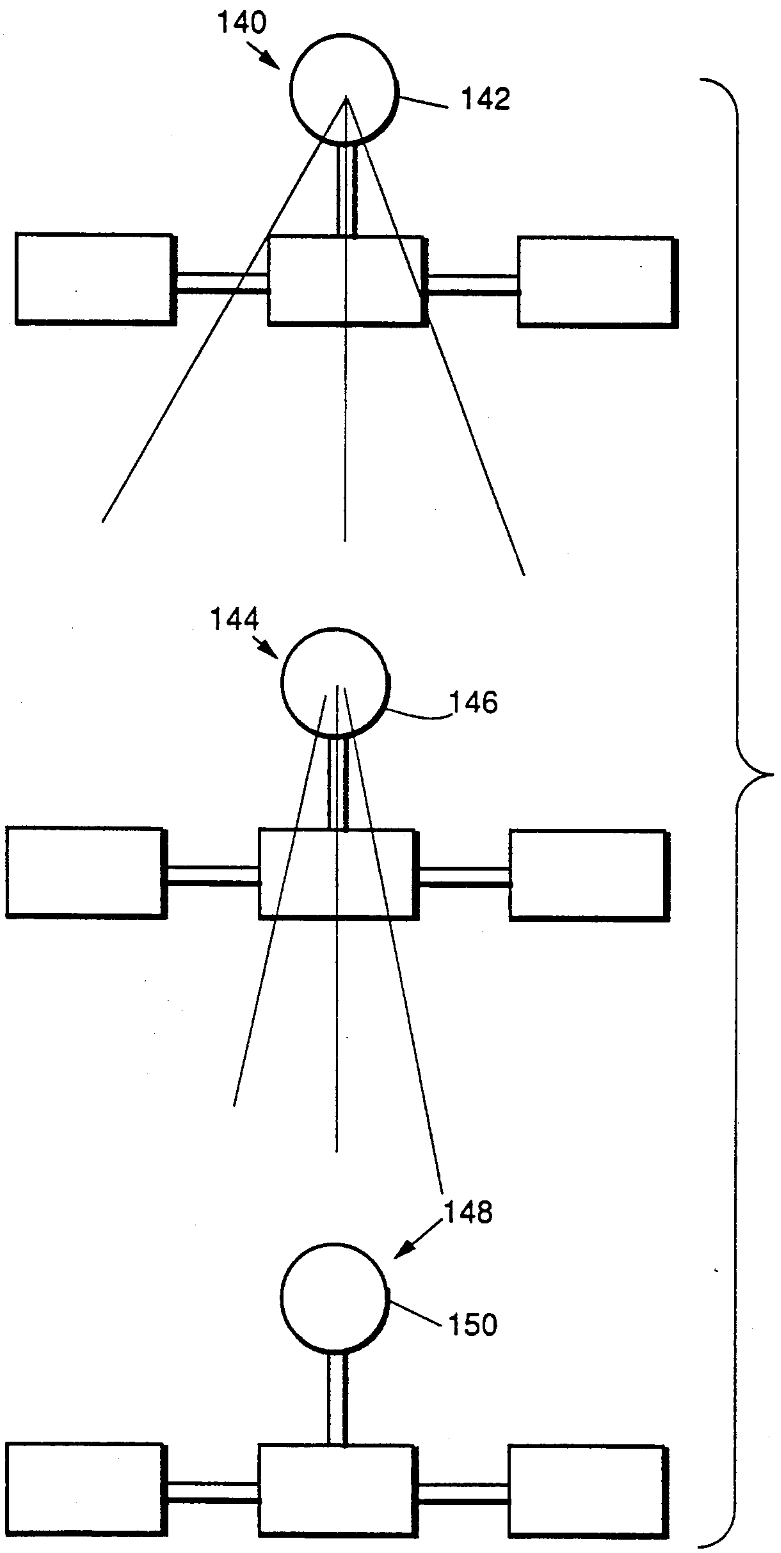
FIG. 4 is a representation of a satellite application of a communication repeater system utilizing the high power waveguide switch of FIGS. 1, 2 and 3.

Such an application is useful in, for example, satellite communications as is shown in FIG. 4. A first satellite 140 comprising a first communication repeater 142 operates on odd channels. A second satellite 144 comprising a second communication repeater 146 operates on even channels. A spare satellite 148 comprising a spare communication repeater 150 can be utilized to switch odd or even channels. Each of the communication repeaters 142, 146 and 150 utilize the waveguide switch 100 of the present invention. The spare satellite 148 provides full redundancy in spacecraft operations. An alternate use of the waveguide switch 100 would include a single output combining waveguide connected to one of two antennas by controlling the switch.

Eliminating the clearance gap 105 precludes the multipaction phenomena in the gap 105 and raises the peak power level at which multipaction occurs to the power level of the waveguide 132. Further, insertion loss is reduced. Insertion loss is defined as the amount of additional power that is absorbed or reflected when the switch under test is inserted into a reference transmission line. When the gap 105 is eliminated creating a single piece of waveguide, the electric field "E" existing in the gap 105 is also eliminated and the ohmic losses are reduced by the rotor temperature. Thus, the power previously wasted in the gap 105 is now retained. Finally, the isolation between RF paths within the switch 100 is increased since the gap 105 is eliminated. The RF energy previously lost by leakage past the gap 105 through unused paths of the waveguide is now transmitted through the switch 100.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such modifications, applications and embodiments within the scope of the present invention.

Accordingly,

What is claimed is:

1. A mechanism for fixing the relative position of two members comprising:

a first member having a first coefficient of thermal expansion and a second member positioned adjacent said first member and having a second coefficient of thermal expansion, said first member and said second member being mounted for relative motion therebetween at a first temperature and being in contact at a relative fixed position at a second temperature.

2. The mechanism of claim 1 further comprising means for providing thermal energy to said first member.

3. The mechanism of claim 1 wherein said first member is a housing.

4. The mechanism of claim 1 wherein said second member comprises a planar member.

5. The mechanism of claim 1 wherein said second member comprises a rotor member.

6. The mechanism of claim 1 wherein said first member comprises a housing having a first opening and said second member comprises a planar member having a second opening and wherein said relative motion between said housing and said planar member permits aligning said first and second openings.

7. The mechanism of claim 1 wherein said first member is a housing having a first opening and said second member is a rotor member having a second opening and wherein said relative motion between said housing and said rotor member permits aligning said first and second openings.

8. The mechanism of claim 1 wherein said first member comprises a housing having a first plurality of housing waveguide openings, said second member comprises a rotor positioned within said housing having a plurality of rotor waveguide openings, and wherein the mechanism further comprises:

means for providing RF energy to said housing; and means for rotating said rotor within said housing for aligning at least two of said plurality of rotor waveguide openings with at least two of said plurality of housing waveguide openings for directing said RF energy through said mechanism.

9. The mechanism of claim 8 wherein said means for rotating said motor includes a mechanical shaft.

10. The mechanism of claim 9 wherein said means for rotating said rotor further includes a motor.

11. The mechanism of claim 10 wherein said means for rotating said rotor further includes a stator winding.

12. The mechanism of claim 11 wherein said means for rotating said rotor further includes a set of bearings.

13. The mechanism of claim 8 wherein a clearance gap exists between said rotor and said housing at said first temperature to permit relative motion therebetween.

14. The mechanism of claim 8 wherein said rotor and said housing each expand at different rates at said second temperature for providing contact at said relative fixed position.

15. A method for fixing the relative position of two members, said method comprising the steps of:

providing a first member having a first coefficient of thermal expansion;

providing a second member positioned adjacent said first member and having a second coefficient of thermal expansion; and providing thermal energy to said first member, said first member and said second member being mounted for relative motion therebetween at a first temperature and being in contact at a fixed relative position at a second temperature.

16. The method of claim 15 further comprising the step of positioning said second member for aligning a second opening formed within said second member with a first opening formed within said first member for directing said thermal energy through said first and second members.

17. The method of claim 16 wherein said step of positioning comprises:

rotating said second member for aligning at least two of a plurality of second member waveguide openings with at least two of a plurality of first member waveguide openings for directing thermal energy through said first and second members.

* * * * *